United States Patent [19]

Wozniak

[11] Patent Number: 4,717,857

[45] Date of Patent: Jan. 5, 1988

[54] FLUORESCENT LAMP PRODUCING WHITE COLOR ILLUMINATION WITH MULTIPLE PHOSPHOR COMBINATION

[75] Inventor: Michael J. Wozniak, Mayfield Heights, Ohio

[73] Assignee: General Electric Company, Schenectady, N.Y.

[21] Appl. No.: 944,790

[22] Filed: Dec. 22, 1986

[51] Int. Cl.$^4$ .............................................. H01J 61/44
[52] U.S. Cl. ..................................................... 313/487
[58] Field of Search ......................................... 313/487

[56] References Cited

U.S. PATENT DOCUMENTS

| | | |
|---|---|---|
| 2,488,733 | 11/1949 | McKeag et al. . |
| 3,109,819 | 11/1963 | Gillooly et al. . |
| 3,748,517 | 7/1973 | Haft ...................................... 313/487 |
| 4,075,532 | 2/1978 | Piper et al. ........................... 313/487 |
| 4,079,287 | 3/1978 | Soules et al. ......................... 313/487 |
| 4,315,192 | 2/1982 | Skwirut et al. ...................... 313/487 |

Primary Examiner—Palmer C. DeMeo
Attorney, Agent, or Firm—J. F. McDevitt; Philip L. Schlamp; Edward M. Corcoran

[57] ABSTRACT

A fluorescent lamp utilizing a four component phosphor combination is provided producing efficient white color illumination at a lower cost than conventional phosphor coatings of the same type. A lamp color temperature of approximately 3500° K. is produced with a blend containing two strontium apatite phosphors, one strontium orthophosphate phosphor and a calcium haloapatite phosphor. The strontium phosphors are blended in weight proportions to match the white color emission point of the calcium haloapatite phosphor component in said blend.

10 Claims, 1 Drawing Figure

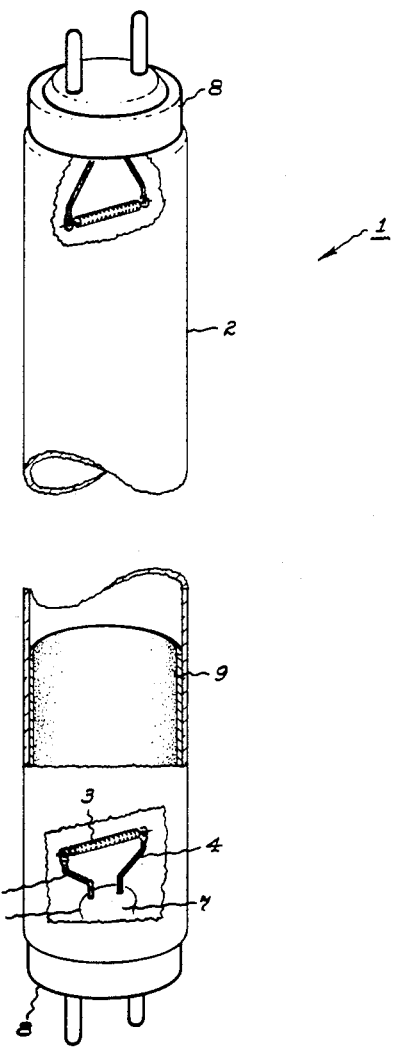

FLUORESCENT LAMP PRODUCING WHITE COLOR ILLUMINATION WITH MULTIPLE PHOSPHOR COMBINATION

BACKGROUND OF THE INVENTION

This invention relates generally to a low-pressure mercury vapor discharge lamp having a particular phosphor coating to emit white light efficiently when excited by the ultra-violet radiation generated from the mercury vapor discharge. More particularly, the present type lamp construction is intended for general illumination at a color temperature of approximately 3500° K. with satisfactory color rendition and comparable efficiency to that now achieved in deluxe-type fluorescent lamps.

The use of several luminescent materials in combination to produce a predetermined overall spectral energy distribution is well known. It is also well known to employ such material combinations as a blended mixture or as a plurality of two or more layers in which one layer generally further comprises a blend of the individual phosphors. A conventional phosphor combination now used as a blended mixture to produce white color emission at a white color point of approximately 3500° K. employs a manganese-activated or antimony-activated strontium haloapatite phosphor constituent including various combinations thereof. Conventional deluxe type fluorescent lamps providing white color illumination also represent a compromise between luminous efficiency (lumen output per watt input) and color rendition since better color rendition is usually achieved with the reduction of as much as 35% or more in luminous efficiency. For example, a deluxe warm-white lamp having a 3000° K. white color point and utilizing a blend mixture of a strontium haloapatite phosphor coactivated with antimony and manganese ions to provide green color emission with a strontium magnesium orthophosphate phosphor activated with tin ion to provide red color emission produces 2150 lumens in a 40T12 lamp size at a color rendering index (CRI) value of approximately 90.

In U.S. Pat. No., 4,079,287, which is assigned to the assignee of the present invention, there is disclosed an improved phosphor coating for a deluxe type fluorescent lamp which produces white color illumination at a color temperature in the range 2700°–6500° K. with a satisfactory color rendition and at higher emission efficiency than the aforementioned prior art deluxe type fluorescent lamps. More particularly, a binary phosphor combination is employed utilizing a strontium haloapatite phosphor with a europium-activated yttrium oxide phosphor to produce lumen values at the 40T12 lamp size up to 2900 along with CRI values up to 90 and higher. A ternery mixture utilizing said phosphor combination together with a conventional calcium haloapatite phosphor coactivated with antimony and manganese ions to provide said white color illumination is also disclosed. Said ternery mixture is said to contain 30–70% by weight of the calcium haloapatite phosphor constituent with the balance consisting of the aforementioned phosphor combination. Since the cost of the yttrium oxide phosphor constituent in this prior art phosphor combination greatly exceeds the cost of all remaining phosphor constituents, however, it becomes desirable to replace this phosphor constituent without unduly sacrificing the lamp performance.

It is a primary object of the present invention, therefore to provide a still lower cost phosphor combination usable in fluorescent lamps providing white color illumination at emission efficiencies and color rendition values acceptable for deluxe type lamps.

It is another important object of the present invention to provide a novel lower cost blend of phosphor materials producing white color emission for deluxe type fluorescent lamps.

Other objects of the present invention will become apparent to those skilled in the art upon consideration of the detailed description hereinafter provided.

SUMMARY OF THE INVENTION

It is now been discovered, surprisingly, that a blended mixture comprising the combination of a blue color emission phosphor selected from strontium haloapatite phosphor coactivated with antimony and manganese ions or calcium haloapatite phosphor activated with antimony ion, a strontium haloapatite coactivated with antimony and manganese ions to provide green color emission, a strontium magnesium orthophosphate phosphor activated with tin ion to produce red color emission, and a calcium haloapatite phosphor coactivated with antimony and manganese ions to provide white color emission produces said white color emission efficiently at a white color point of approximately 3500° K. along with exhibiting color rendering indices ranges between about 64–74. All said blue color emission, green color emission and red color emission phosphors being utilized in the present phosphor combination are combined in weight proportions to achieve approximately the same white color point as exhibited by the remaining calcium haloapatite phosphor constituent in said phosphor combination. The weight ratio for said blue color emission phosphor, green color emission phosphor, and red color emission phosphor in said phosphor combination is approximately 9 weight percent of the blue color emission phosphor, approximately 51 weight percent of the green color emission phosphor, and approximately 40 weight percent of the red color emission phosphor with respect to the aggregate content of said phosphor components in the overall phosphor combination. Additionally, said overall phosphor combination contains approximately 50–75 weight percent of the calcium haloapatite phosphor coactivated with antimony and manganese ions to provide white color emission.

The particular calcium haloapatite and strontium haloapatite phosphor materials which can be utilized in the present phosphor combination are already well known and the general class of such phosphor materials is described in U.S. Pat. No. 2,488,733 to McKeag and Ranby. Likewise, the strontium magnesium orthophosphate phosphor activated with tin ion which produces red color emission in the present phosphor combination is also well known and commercially available. Various methods are similarly well known to produce said phosphors at a nominal cost such as that described in U.S. Pat. No. 3,109,819 for the preparation of efficient strontium and calcium haloapatite phosphor materials. Accordingly, it can be appreciated that a replacement of relatively more expensive phosphor materials has been achieved in the present phosphor combination as the principal means of accomplishing the desired objectives.

The selected strontium haloapatite phosphor coactivated with antimony and manganese ions producing blue color emission in the present phosphor combination can be represented by the following general formula:

$$Sr_{10-x-y}Sb_xMn_y(PO_4)_6 \cdot A_2$$

wherein A is a halide ion selected from F and Cl including combinations thereof, x is in the approximate range 0.2–0.10 and y is in the approximate range 0–0.002. Alternatively, a preferred calcium haloapatite phosphor activated with antimony ion to produce blue color emission in the present phosphor combination can be represented by the following general formula:

$$Ca_{10-x-y}Sb_xCd_z(PO_4)_6 \cdot A_2$$

wherein A is a halide ion selected from F and Cl including combinations thereof, x is in the approximate range 0.0–0.10, and z is in the approximate range 0.0–0.10. An especially preferred non stoichiometric phosphor material of said type which can be used is:

$$Ca_{9.79}Cd_{0.052}(PO_4)_6(F_{0.95})_2 \cdot Sb_{0.078}$$

which exhibits C.I.E. color coordinates of $X=0.221$ and $Y=0.281$.

The selected strontium haloapatite phosphor coactivated with antimony and manganese ions to produce green color emission in the present phosphor combination can be represented by the following general formula:

$$Sr_{10-x-y}Sb_xMn_y(PO_4)_6 \cdot A_2$$

wherein A is a halide ion selected from F and Cl including combinations thereof, x is in the approximate range 0.02–0.10 and y is in the approximate range 0.12–0.20. A preferred nonstoichiometric phosphor material of said type which can be used is $Sr_{9.67}(PO_4)_6(F_{1.92}) \cdot Sb_{0.056}Mn_{0.168}$ which exhibits C.I.E. color coordinates of $X=0.333$ and $Y=0.412$. A useful strontium magnesium orthophosphate phosphor activated with tin ion to provide red color emission in the present phosphor combination can be represented by the general formula:

$$(SrMg)_3(PO_4)_2 \cdot Sn_a$$

wherein a is in the approximate range 0.02–0.03. Said particular phosphor material is of a stabilized high-temperature form which is further described in the technical article "Phase Equilibria and Tin-Activated Luminescence in Strontium Orthophosphate LSystems, authored by J. F. Sarver, F. A. Hummel, and M. V. Hoffman, J. Electrochem. Soc., Vol 108, No. 12 (1961). A preferred non stoichiometric phosphor material of said type which can be used is: $Sr_{2.572}Mg_{0.338}(PO_4)_2 \cdot Sn_{O.026}$ which exhibits C.I.E. color coordinates of $X=0.480$ and $Y=0.386$. The selected remaining phosphor material for use in the present phosphor combination and which exhibits emission at desired 3500° K. white color point can be represented by the following general formula:

$$Ca_{10-x-y-z}Sb_xMn_yCd_z(PO_4)_6 \cdot A_2$$

wherein A is a halide ion selected from F and Cl including combinations thereof, x is in the approximate range 0.04–0.10, y is in the approximate range 0.20–0.30, and z is in the approximate range 0.10. A preferred non stoichiometric haloapatite phosphor of said type which can be used is $Ca_{9.53}Cd_{0.071}(PO_4)_6(Cl_{0.08}F_{0.89})_2 \cdot Sb_{0.072}Mn_{0.25}$ which exhibits C.I.E. color coordinates of $X=0.409$ and $Y=0.394$.

BRIEF DESCRIPTION OF THE DRAWING

The accompanying drawing is a perspective view partially broken away of a fluorescent lamp construction in accordance with the present invention.

DESCRIPTION OF THE PREFERRED EMBODIMENTS

Referring to FIG. 1, there is shown a fluorescent lamp 1 comprising an elongated soda-lime silicate glass bulb 2 with a circular cross-section. The discharge assembly in said lamp has the usual electrode structure 3 at each end supported by in-lead wires 4 and 5 which extend through a glass press seal in a mount stem 7 to the contacts of a base 8 affixed at opposite ends of the lamp. The discharge-sustaining filling in the glass tube is an inert gas such as argon or a mixture of argon and other gases at a low pressure in combination with a small quantity of mercury to provide the low vapor pressure manner of lamp operation. The inner surface of the glass bulb is provided with a phosphor coating 9 which is applied extending substantially the full length of the bulb and around the bulb circumferential inner wall.

Lamps according to the present invention exhibiting the desired 3500° K. white color point were built utilizing approximately 5.8 grams of the present multi-phosphor blend. The particular phosphor blend contained approximately 2.7 weight percent of the strontium haloapatite phosphor emitting blue color radiation, approximately 15.3 weight percent of the strontium haloapatite phosphor emitting green color radiation, approximately 12.0 weight percent of the strontium magnesium orthophosphate phosphor emitting red color radiation, and approximately 70 weight percent of the calcium haloapatite phosphor emitting the white color radiation at the desired lamp color point. Said test lamps measured 2845 lumens after 100 hours burning at a CRI value of 64. The lumen output and CRI values of still other 40T12 size test lamps employing the present phosphor combination as a blended mixture are reported in the Table below.

TABLE

| Example | Weight Fraction Calcium Haloapatite Phosphor | CRI | Lumens (100 Hrs.) |
|---|---|---|---|
| 2 | 0 | 78 | 2352 |
| 3 | 0.5 | 68 | 2707 |
| 4 | 0.6 | 66 | 2759 |
| 5 | 0.7 | 64 | 2845 |
| 6 | 0.8 | 62 | 2877 |
| 7 | 1.0 | 58 | 3021 |

It is evident from the foregoing test results that acceptable lumens and CRI values for deluxe type fluorescent lamps are achieved with the present phosphor combination. It can be further noted from said test results that optimum lamp performance in said regard is achieved when said phosphor combination contains a 50–70 weight percent fraction of the calcium haloapatite phosphor component producing the white color emission when utilizing the above identified preferred phosphor materials.

It will be apparent from the foregoing description that while specific examples have been provided on representative lamps used in the practice of the present invention, that various modifications of the individual phosphor components in the present phosphor combination can be utilized to alter to the lamp performance characteristics. Accordingly, it is intended to limit the present invention only by the scope of the following claims:

What I claim as new and desire to secure by Letters Patent of the United States is:

1. In a fluorescent lamp comprising a glass envelope having electrodes at its ends, a mercury and inert gas filling within said envelope which produces ultraviolet radiation, and a phosphor coating which converts a substantial portion of said ultraviolet radiation to visible illumination having a white color, the improvement wherein said phosphor coating comprises a combination of a blue color emission phosphor selected from strontium haloapatite phosphor coactivated with antimony and manganese ions or calcium haloapatite phosphor activated with antimony ion, a strontium haloapatite phosphor coactivated with antimony and manganese ions to provide green color emission, a strontium magnesium orthophosphate phosphor activated with tin ion to produce red color emission, and a calcium haloapatite phosphor coactivated with antimony and manganese ions to provide white color emission at the desired white color point, all said blue color emission, green color emission, and red color emission phosphors being combined in weight proportions to achieve approximately the same desired white color point.

2. A fluorescent lamp as in claim 1 wherein said phosphor combination is a blended mixture.

3. A fluorescent lamp as in claim 1 wherein said strontium haloapatite phosphor coactivated with antimony and manganese ions to provide blue color emission has the general formula:

$$Sr_{10-x-y}Sb_xMn_y(PO_4)_6 \cdot A_2$$

wherein A is a halide ion selected from F and Cl including combinations thereof, X is in the approximate range 0.2–0.10 and y is in the approximate range 0–0.002.

4. A fluorescent lamp as in claim 1 wherein said calcium haloapatite phosphor activated with antimony ion to provide blue color emission has the general formula:

$$Ca_{10-x-y}Sb_xCd_z(PO_4)_6 \cdot A_2$$

wherein A is a halide ion selected from F and Cl including combinations thereof, x is in the approximate range 0.02 and 0.10, and z is in the approximate range 0–0.10.

5. A fluorescent lamp as in claim 1 wherein said strontium haloapatite phosphor coactivated with antimony and manganese ions to provide green color emission has the general formula:

$$Sr_{10-x-y}Sb_xMn_y(PO_4)_6 \cdot A_2$$

wherein A is a halide ion selected from F and Cl including combinations thereof, x is in the approximate range 0.02–0.10 and y is in the approximate range 0.12–0.20.

6. A fluorescent lamp in claim 1 wherein said strontium magnesium orthophosphate phosphor activated with tin ion to provide red color emission has the general formula:

$$(SrMg)_3(PO_4)_2 \cdot Sn_a$$

wherein a is in the approximate range 0.02–0.03.

7. A fluorescent lamp as in claim 1 wherein the calcium haloapatite phosphor, coactivated with antimony and manganese ions to provide white color emission has the general formula:

$$Ca_{10-x-y-z}Sb_xMn_yCd_z(PO_4)_6 \cdot A_2$$

wherein A is a halide ion selected from F and Cl including combinations thereof, x is in the approximate range 0.04–0.10, y is in the approximate range 0.20–0.30, and z is in the approximate range 0.10.

8. A fluorescent lamp as in claim 1 wherein the weight ratio for said blue color emission phosphor, green color emission phosphor, and red color emission phosphor to provide white color emission at the desired white color point is approximately 9 weight percent of the blue color emission phosphor, approximately 51 weight percent of the green color emission phosphor, and approximately 40 weight percent of the red color emission phosphor with respect to the aggregate content of said blue, green and red phosphor components in the overall phosphor combination.

9. A fluorescent lamp as in claim 1 wherein said overall phosphor combination contains approximately 50–75 weight percent of the calcium haloapatite phosphor coactivated with antimony and manganese ions to provide white color emission.

10. A fluorescent lamp as in claim 1 wherein said glass envelope comprises a cylindrical tube.

* * * * *